Sept. 23, 1969  L. F. KUTIK ET AL  3,467,990
MOLD APPARATUS FOR BRISTLED PRODUCTS
Filed Feb. 16, 1967  5 Sheets-Sheet 1
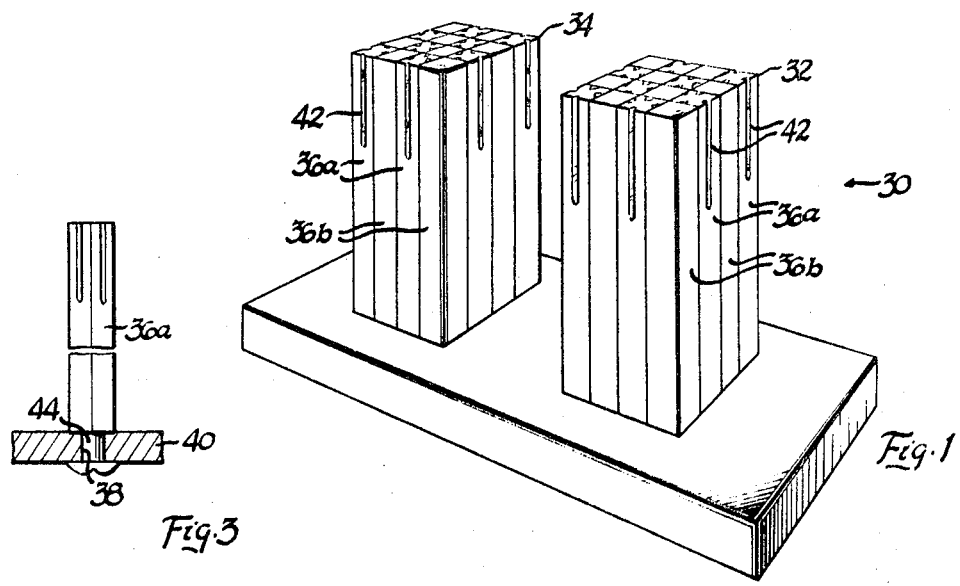
Fig. 1
Fig. 3
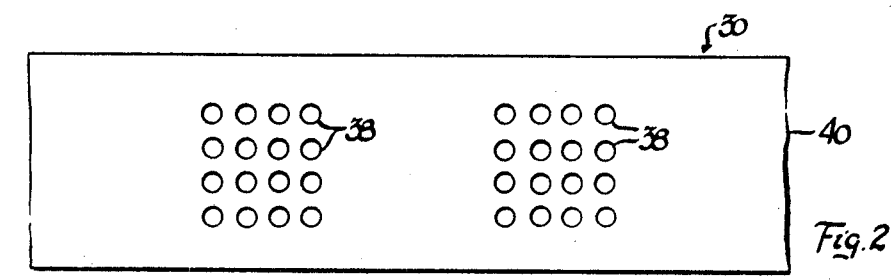
Fig. 2
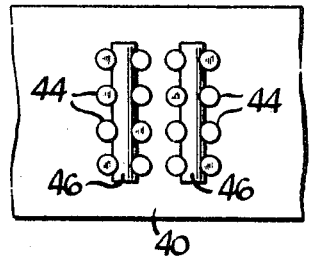
Fig. 4
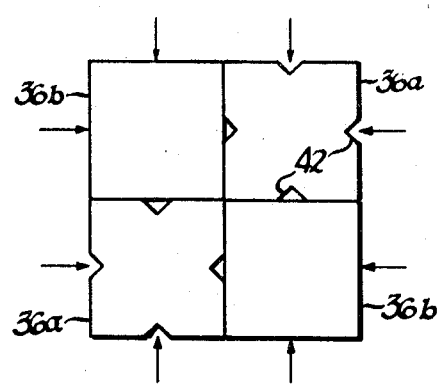
Fig. 5
INVENTORS
Louis F. Kutik
BY Erich W. Gronemeyer
ATT'YS.

INVENTORS
Louis F. Kutik
Erich W. Gronemeyer
BY

ATT'YS.

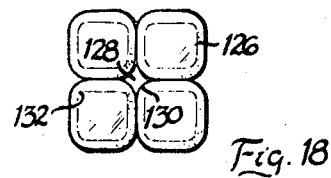
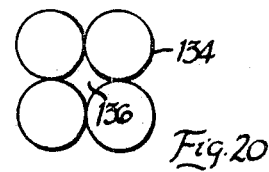
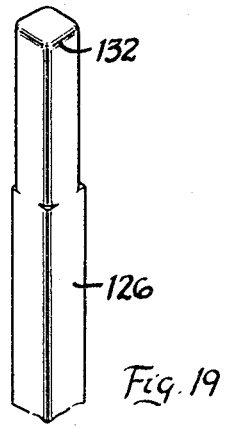
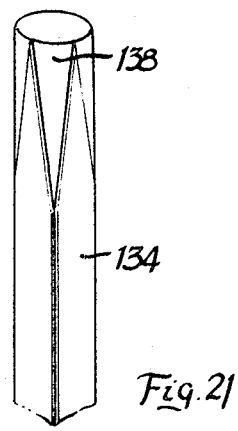
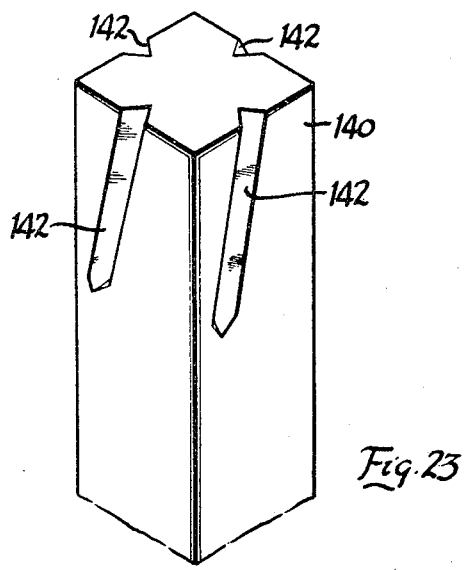
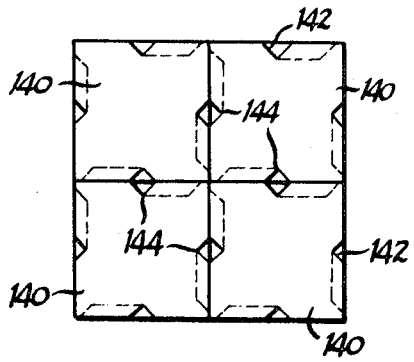
INVENTORS
Louis F. Kutik
Erich W. Gronemeyer
BY
ATT'YS.

INVENTORS
Louis F. Kutik
Erich W. Gronemeyer
BY

ATT'YS.

United States Patent Office 3,467,990
Patented Sept. 23, 1969

3,467,990
MOLD APPARATUS FOR BRISTLED PRODUCTS
Louis F. Kutik, 5601 SW. 56th St. 33314, and Erich W. Gronemeyer, 3430 Galt Ocean Drive 33308, both of Fort Lauderdale, Fla.
Filed Feb. 16, 1967, Ser. No. 616,670
Int. Cl. A46b *1/00;* A47g *27/02*
U.S. Cl. 18—42                        11 Claims

ABSTRACT OF THE DISCLOSURE

A mold assembly and a method of molding bristled products such as brushes and floor mats is provided. Also, novel bristle configurations are proposed. The mold assembly includes a group of elongated members or "pins" retained in parallel, lateral abutting, cantilevered relation with the free end faces of said members flush with each other. Bristle-forming cavities are formed between pins by grooves or especially configured concave surfaces formed at the sides of the members, such grooves or surfaces opening onto and extending longitudinally from the flush end faces. The bristle-forming cavities open onto a second cavity which defines the backing element joining the bristles into a brush or similar product. Plasticized material is injected into the backing-defining cavity and from there into the bristle-forming cavities, any air being vented from the latter cavities between the pins as the plasticized material enters. During molding, the pins are held together at the bristle-forming ends thereof by cams which apply force to at least two sides of the group of members in directions normal to each other. When the cams are released, the elongated members can spread apart slightly, and thus release bristles in the cavities to facilitate removal of the bristles from the cavities. The completed bristled product is then withdrawn from the mold assembly.

Background of the invention

It has been proposed, for example in my earlier U.S. Patent 2,783,501, to make brushes, mats and the like by providing grooves in round elongated members which are fitted into precision holes in a plate to define bristle-forming cavities. A disadvantage of this approach is that there is no way in which wear or erosion of the bristle-forming mold parts can be compensated or corrected. When the wear becomes excessive, the mold parts must be discarded. It has also been found that it is difficult to dissipate heat that is transferred into the perforated plate from the heated plastic that forms the bristles. Furthermore, the mold using round elongated members with grooves therein is somewhat more costly than is desirable. Only a limited variety of bristle shapes can be made by this technique.

It has also been proposed in my earlier Patent No. 3,214,777, that bristled products be made by using a mold assembly made up of plates or blades having slots in one edge thereof and held together so that the slots form bristle-defining cavities. This approach, although very satisfactory for some applications, does have certain drawbacks. For instance, the pattern and density of bristles that may be formed on a backing member is somewhat limited by the blade-like configuration of the mold plates. The bristle shapes which can be formed in this manner also are restricted, the bristles necessarily being rectangular in cross-section.

Summary of the invention

It is now proposed to mold bristled products using a mold assembly which comprises a group of elongated members or "pins" which are held together at one end thereof in generally parallel, longitudinally abutting relation with each other, but loosely assembled at the other ends thereof and with end faces at those ends flush with each other. The latter ends are the bristle-defining ends of the elongated members. Bristle-forming cavities are formed between adjacent pins by means of grooves or especially configured surfaces at the sides of the pins and extending longitudinally from the flush end faces. The bristle-defining ends of the pins are held together in a group, which in a preferred embodiment is square or rectangular, and the bristle-forming cavities are formed between adjoining members of the group. The backing portion of the bristled product is formed by a backing-defining cavity which communicates with the bristle-forming cavities. Plasticized material is supplied to the backing-defining cavity and from there to the bristle-forming cavities, and air is vented from the latter cavities between the members as the plasticized material enters the cavities. The plasticized material solidifies, and the cams are then released to release the elongated members. The elongated members then spread apart slightly so that the bristled product can be withdrawn easily from the mold assembly.

Accordingly, it is an object of the present invention to provide a novel mold apparatus for forming bristled products wherein bristles are formed between elongated members held in parallel abutting relation.

Another object of the invention is to provide a mold assembly for forming bristled products wherein the bristles may be released on all sides thereof after they have been formed to facilitate removal of the bristled product from the mold assembly.

A further object of the invention is to provide a mold assembly of molding wherein a variety of bristle shapes and bristle arrangements may be formed.

Other objects of this invention will appear in the following description and appended claims, reference being had to the accompanying drawings forming a part of this specification wherein like reference characters designate corresponding parts in the several views.

On the drawings:

FIGURE 1 is a perspective view of a mold assembly in which elongated members are retained in groups to define bristle-forming cavities between them;

FIGURE 2 is a bottom plan view of the assembly of FIGURE 1;

FIGURE 3 is a partial view of one elongated member showing how it is fastened to a plate;

FIGURE 4 is a fragmentary plan view showing an alternate way of fastening elongated members to a plate;

FIGURE 5 is a plan view of four elongated members having grooves for defining bristle-forming cavities;

3

Figure 10:
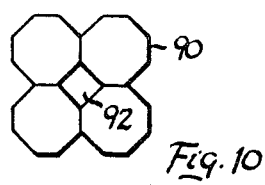
FIGURE 10 is a top plan view of four elongated members having an octagonal configuration at the bristle-forming ends thereof.
Figure 12:
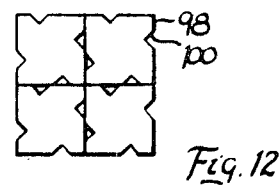
Figure 11:
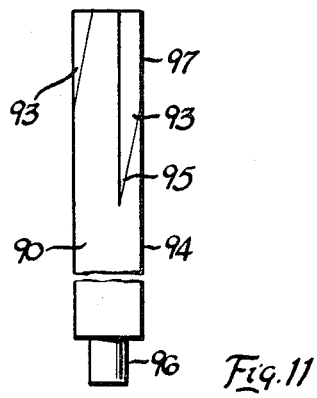
Figure 13:
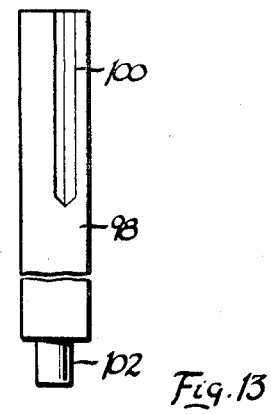
Figure 14:
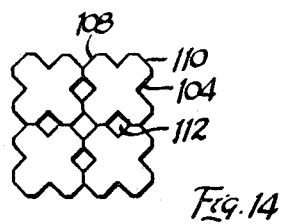
Figure 16:
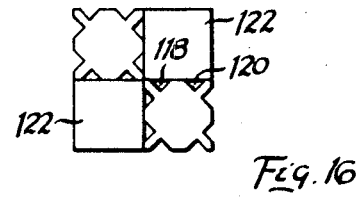
Figure 15:
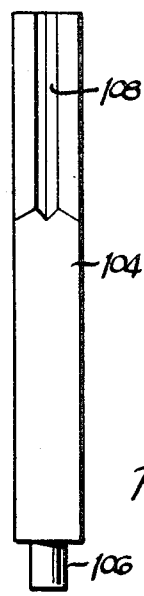
Figure 17:
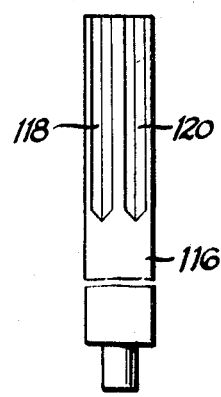
Figure 24:
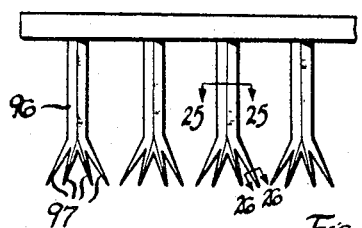
Figure 29:
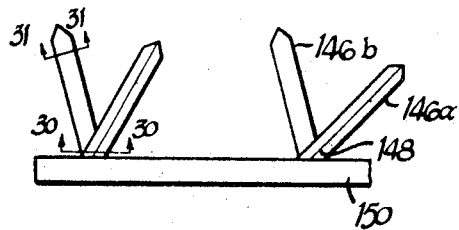
Figure 25:
Figure 30:
Figure 26:
Figure 31:
Figure 27:
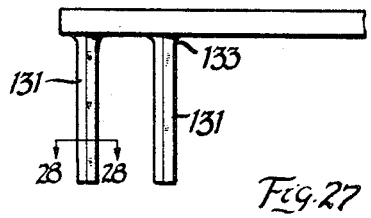
Figure 28:

FIGURE 11 is an elevational view of one of the elongated members of FIGURE 10;

FIGURE 12 is a top plan view of four rectangular elongated members having grooves therein arranged to form bristle-defining cavities between adjoining members;

FIGURE 13 is an elevational view of one of the elongated members of FIGURE 12;

FIGURE 14 is a top plan view of four elongated members having a groove in each side thereof and having ground-off corners for forming bristle-forming cavities;

FIGURE 15 is an elevational view of one of the elongated members of FIGURE 14;

FIGURE 16 is a top plan view of four elongated members, two of which are grooved and two of which are blank, arranged to form cavities between the members;

FIGURE 17 is an elevational view of one of the elongated members of FIGURE 16;

FIGURE 18 is a top plan view of four elongated members having rounded-off corners which form a bristle-forming cavity between the four members;

FIGURE 19 is a fragmentary perspective view of one of the elongated members of FIGURE 18;

FIGURE 20 is a top plan view of four elongated members which are round at the bristle-defining ends thereof;

FIGURE 21 is a fragmentary perspective view of one of the elongated members of FIGURE 20;

FIGURE 22 is a top plan view of four elongated members having slanting grooves therein for defining twin bristles;

FIGURE 23 is a fragmentary perspective view of one of the elongated members of FIGURE 22;

FIGURE 24 is a view of a bristled product wherein a plurality of tips are provided on each bristle, the product being made by the apparatus of FIGURES 10 and 11;

FIGURE 25 is a sectional view taken along the plane 25—25 of FIGURE 24;

FIGURE 26 is a sectional view taken along the plane 26—26 of FIGURE 24;

FIGURE 27 is a view of a product made by the apparatus of FIGURES 18 and 19;

FIGURE 28 is a sectional view taken along the plane 28—28 of FIGURE 27;

FIGURE 29 is a view of a product made by the apparatus of FIGURES 22 and 23;

FIGURE 30 is a sectional view taken along the plane 30—30 of FIGURE 29;

FIGURE 31 is a sectional view taken along the plane 31—31 of FIGURE 29.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

Referring first to FIGURES 1 through 3, a mold assembly 30 is shown which includes two groups 32 and 34 of elongated members or rods or pins 36, each retained at one end thereof in an aperture 38 extending through a plate 40. It may be seen that rods 36a have grooves 42 at their upper ends, whereas alternate rods 36b are blank. All of the rods 36a and 36b are square or rectangular, hexagonal, octagonal or polygonal in cross-sectional configuration, and the overall configuration of the groups of rods 32 and 34 is also square.

All of the rods 36 have a cylindrical portion 44 which extends through the corresponding aperture 38 in the plate 40, and FIGURES 3 and 4 show two ways of securing the rods to the plate 40. In FIGURE 3, the cylindrical portion 44 is peened to force metal out over the edge of the aperture 38 and thereby stake the rod in place. In

4

FIGURE 4, the bottom end of each cylindrical portion 44 projects beyond the bottom surface of the plate 40, and each of the cylindrical portions 44 have a groove which receives a pin 46. Thus, the pins 46 hold the rods 36 against axial displacement and secure the rods to the plate 40.

FIGURE 5 is an enlarged view of the upper ends of the rods 36a and 36b. It may be seen that the rods 36a have four side faces forming a square configuration for the upper end of the rod, and each of the side faces has a groove 42 formed therein by milling, grinding or the like. The grooves 42 extend a relatively short distance along the length of the rod 36a and define with the adjoining members 36b triangular bristle-forming cavities. In this embodiment, the rods 36b do not have grooves therein, but their flat faces abut against the flat faces of rods 36a to form one wall of each of the cavities 42. There are four grooves 42 in each rod 36a, and consequently four bristle-forming cavities 42 are formed by each rod 36a with the adjoining blank rods 36b.

In FIGURE 1, the rods 36a and 36b are shown in abutting parallel relation with each other, and the top ends of the rods are shown in complete contact with each other. In actuality, however, the confinement of the lower ends of the rods in the apertures 38 through the plate 40 is not sufficient to hold the rods together at the top ends of the rods. Rather, the rods 36a and 36b will separate from each other slightly at the top or bristle-forming ends thereof in the manner shown particularly in FIGURE 9, due to some inherent or deliberate axial distortion thereof. Thus, some means must be provided to hold the bristle-forming portions of the rods together when bristles are being molded therebetween. An example of cams suitable for this purpose is shown in FIGURES 6 through 9, as will be later described in detail.

Figure 6:
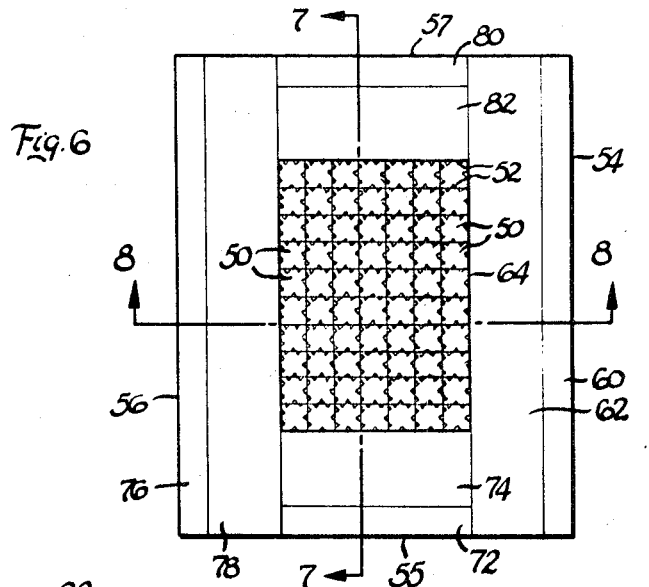
FIGURE 6 is a top plan view of a group of elongated members having bristle-forming cavities, the group being held together by cams disposed on four sides thereof.
Figure 7:
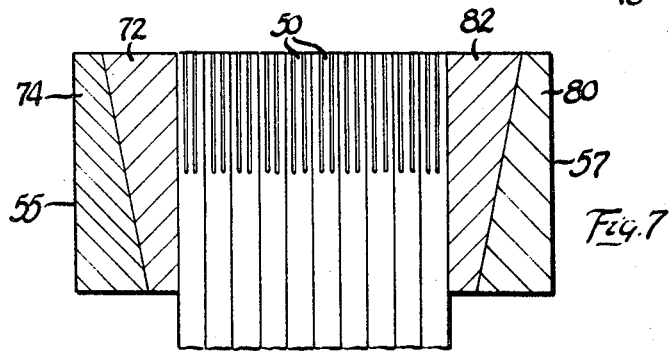
FIGURE 7 is a sectional view taken along line 7—7 of FIGURE 6.

The bristle-forming ends of the rods 50 shown in FIGURE 6 have a slightly different configuration than the rods 36a of FIGURES 1 through 5, but the lower ends of the group of rods are held by a plate 40 in the same manner as has been described in connection with FIGURES 1 through 5. The upper ends of the rods 50 in FIGURE 6 are square in configuration, and each rod 50 has six grooves therein. Two sides of each rod have two grooves in each side, and the other two sides each have only one groove. The pattern of grooves is such that each groove abuts a flat surface of the adjoining rods so that triangular bristle-forming cavities are formed by the grooves. The overall group of rods is rectangular in configuration, and holding force is applied to all four sides of this rectangle. It would be possible to apply force to only two sides of the rectangle, the other two sides being merely held in place, but in this embodiment force is applied to all four sides of the rectangle.

Figure 8:
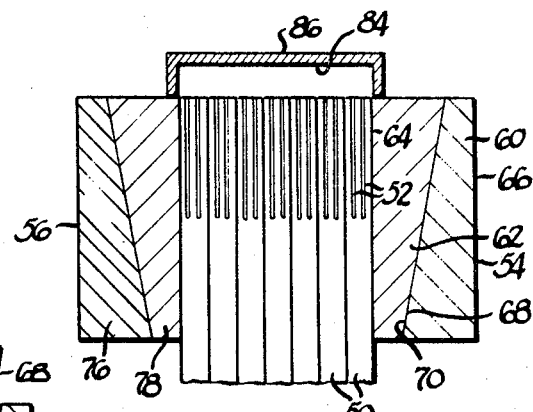
FIGURE 8 is a sectional view taken along line 8—8 of FIGURE 6.

This is accomplished by angle plate cams 54, 55, 56 and 57. Considering cam 54 by way of example, it is made up of two angle plates 60 and 62 whose side configuration is shown in FIGURE 8. A flat face 64 is provided on angle plate 62, and the face 64 bears against one side of the elongated members 50. Plate 60 has a surface 66 which is parallel to surface 64 of plate 62. The two plates 60 and 62 have surfaces 68 and 70 which are at an acute angle with respect to surfaces 64 and 66, and the two angled surfaces 68 and 70 contact each other when the cams are in their closed position. Cam plate 60 is wedged upwardly relative to cam plate 62, and this forces cam plate 62 to the left as viewed in FIGURE 8, thus forcing cam plate 62 against the side of the members 50.

The other cams 55, 56 and 57 are also composed of two cam plates, cam 55 having two plates 72 and 74, cam 56 having two plates 76 and 78, and cam 57 having two plates 80 and 82. Each of these cams has angled surfaces corresponding to surfaces 68 and 70 which cause the cam plates to wedge against each other and apply force to one side of the rectangular group of elongated members 50.

Referring again to FIGURES 8 and 9, it may be seen in FIGURE 8 that when the cam plates are in their closed position as shown in FIGURE 8, the bristle-forming ends of the members 50 are forced in close contact with each other. The bristle-forming cavities 52 are formed between adjoining members. A backing-defining cavity 84 is formed by a separate member 86 which fits over the flush ends of the members 50 as shown in FIGURE 8. The backing-defining cavity 84 communicates with all of the bristle-defining cavities 52 of members 50, and it is apparent from FIGURE 8 that when plasticized material is injected into the cavities 84 and 52, bristles will be formed integrally with a backing portion which in turn is formed in the cavity 84. The type of overall mold arrangement, including the cam mechanism, backing recess, etc. is shown and described in detail in my application Ser. No. 590,849, filed Oct. 31, 1966, and repetition thereof in this application seems unnecessary.

Figure 9:
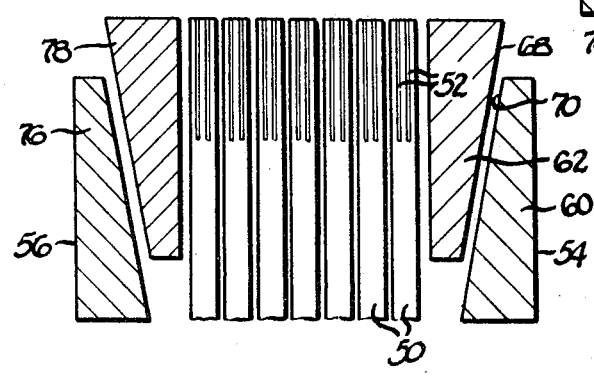
FIGURE 9 is a view similar to FIGURE 8, but showing the cams released and the elongated members separated from each other.

In practicing the manner of using the invention, plasticized plastic material is injected into the cavity 84 and from there into the bristle-defining cavities 52 between the elongated members 50. As plasticized material enters the bristle-forming cavities 52, air is vented from the latter cavities between the adjoining members. Thus, the cavities 52 are self-venting to avoid any build up of heat and perhaps charring of the plastic material at the bottoms of the cavities 52. During these steps just referred to, the cams 54, 55, 56 and 57 are in their closed position so that the upper ends of the elongated members 50 are held tightly together, thereby confining the plasticized material to the space in the cavities 52. The plasticized material is allowed to solidify in the cavities to form bristles integral with a backing portion. After this, the two cam plates of each of the cams 54, 55, 56 and 57 are separated from each other in the manner shown in FIGURE 9 to release the upper ends of the members 50. These upper ends then spread apart slightly as illustrated in FIGURE 9, thus, completely releasing the bristles which have been formed in the cavity 52 and allowing the backing portion and the integral bristles to be withdrawn easily from the mold assembly.

FIGURES 10 and 11 show elongated members 90 which have an octagonal configuration at their bristle-defining ends for forming a single bristle centrally of each group of four elongated members. Such a bristle-defining cavity 92 is shown in FIGURE 10. The configuration of the member 90 at its central portion 94 is square, and it may be noted that the corners of the square have been machined off to form the octagonal configuration at the upper or bristle-defining end of the member 90. The bottom of the member 90 is round at 96 to allow the member to be inserted into round apertures in a plate 40 as described previously. Only four members 90 have been shown in FIGURE 10, and it will be understood that as many elongated members can be placed together as desired. The showing of four adjoining members serves only to illustrate the principle and the configuration of the members.

It may be noted in FIGURE 11 that at the portion of the member 90 where the octagonal configuration of the upper portion 97 merges into the square configuration of the central portion 94, a slanted groove 95 has been cut in the flat faces 93. These grooves 95 serve to form four tips at the end of the bristle which is defined by the elongated member 90. Bristles with such tips are shown in FIGURE 25, and it may be seen that each bristle 96 has four tip portions 97 at its lower end. Each bristle 96 is rectangular in cross-section, while each tip 97 is triangular. The rectangular shank is formed at the intersection of four pins 90, and each of the tips 97 is formed between two pins 90, only one of which is grooved at that point. The tipped portions 97 are more flexible than the shank 96 of the bristle, and so will conform easily to irregularities in a surface which may be brushed with the bristles. Alternatively a floor mat or tile may be made with a soft or resilient surface defined by the bristle tips and a stiffer, load supporting underbody defined by the bristle shanks. Varying the dimensions will yield varying degrees of resiliency and/or support. It will be understood that the bristles could be formed without these tips merely by omitting the grooves 95, if desired.

FIGURES 12 and 13 show elongated members 98 which are square at the bristle-defining ends thereof, and each side of the square member 98 has one groove 100 machined therein. The grooves 100 are offset from the center of the face in which they are provided, and it may be seen that each groove abuts a flat face on the adjoining elongated member so that the bristle-defining cavities are triangular in configuration. The members 98 are square through their length except for the round portion 102 at the bottom end thereof for fitting into apertures in a plate such as plate 40 described previously.

FIGURES 14 and 15 show another configuration for the elongated members of the mold assembly of the invention. The elongated member 104 is generally square in configuration throughout its length except for the rounded portion 106 at the bottom. A groove 108 is formed in each side face of each of the members 104. In addition, the corners of the member 104 at the bristle-defining end thereof are machined off to provide flat surfaces 110 where the corners originally were. Thus, it may be seen that each group of four members 104 forms five bristle-defining cavities 112 as shown in FIGURE 14. The cavities 112 are square in configuration so that the bristles will have sharp edges thereon.

FIGURES 16 and 17 illustrate a configuration for the elongated members for forming a plurality of triangular bristles. Again, the elongated member 116 is generally square in configuration, and each side of the square is provided with two grooves 118 and 120 as shown. Alternate elongated members 112 are blank, so that the flat side surfaces thereof form one boundary of the triangular grooves 118 and 120.

FIGURES 18 and 19 show generally square elongated members 126 which have their corners rounded off at the upper or bristle-forming ends thereof to form a bristle-forming cavity 128 which has concave side surfaces 130. Each group of four members 126 defines one central bristle-forming cavity 128. It may be seen from FIGURES 27 and 28 that the corners of each bristle 131 formed in the cavity 128 will be unusually sharp, and therefore will provide good scrubbing action. Further, the upper end of each pin 126 is chamfered as at 132 to provide a reinforcing fillet 133 at the root of each bristle 131.

FIGURES 20 and 21 show elongated members 134 which are round at the upper end thereof. Four of the members 134 are held together as in FIGURE 20 to form one bristle-forming cavity 136 centrally thereof, and this cavity 136 will form a bristle which has four unusually sharp edges, again to provide good scrubbing action. The member 134 may be round for the full length of the bristle-defining cavities 136, or they may be tapered as shown in FIGURE 21 to form pointed bristles. The curved surfaces 138 at the upper end of the member 134 merge into the square side surfaces of the central portion of member 134 so that the rounded configuration at the tip of member 134 merges into the square configuration at the central portion of member 134.

FIGURES 22 and 23 illustrate elongated members 140 which are adapted to mold bristled products having twin bristles of the type shown in FIGURE 29. The elongated members 140 are square in configuration at the bristle-defining ends thereof, and each side face of each member 140 has a single groove 142 machined therein. It may be seen in FIGURE 24 that each of the grooves 142 slants relative to the vertical direction, and all of the grooves slant in the same direction when viewed in a direction perpendicular to the face in which a given groove is provided.

When the elongated members 140 are assembled in a square group as in FIGURE 22, four complete bristle-forming cavities 144 are defined by side faces of adjoining members. It should be noted, however, that the two grooves forming a given cavity slant in opposite directions. Thus, when plasticized material is molded in the cavities 144, a bristle is formed in each cavity which has a common base portion, rectangular in section, and two finger portions, each triangular in section. Bristles of this type having twin fingers 146a and 146b joined at a common base 148 to a backing 150 are shown in FIGURES 29 through 31.

Thus, it will be seen that the bristle-defining portions of the elongated members provided in the molded assembly of the invention may have a variety of configurations, but in each case the bristle cavities are defined by at least two adjoining members or pins. The members are held together in groups to form the bristle-forming cavities, and the number of bristles formed by each group of members varies according to the particular configuration of the elongated member. The cross-sectional shape of the bristles depends upon the shape of the pin grooves and the number of grooves which co-operate to define one cavity. For example, a single bristle may be defined by one groove (FIGURE 5), by two grooves (FIGURE 14) or by four grooves (FIGURE 18). By defining the shank portion of a bristle by four pins and the tips by one groove each a configuration such as FIGURE 24 is obtained, while a combination of two pins and individual grooves produces the bristle of FIGURE 29. Obviously, the permutations and combinations are numerous and only examples have been shown.

The elongated members are held together by a simple camming structure which applies a great deal of force to the members so that they contact each other intimately and will not allow plasticized material to seep out of the bristle-forming cavities. The elongated members separate transversely when the camming structure is released, and each bristle is released on all sides thereof so it can be easily removed from the mold assembly. The mold assembly is quite economical, and no complicated machining of the mold members is necessary. The elongated mold members are self-venting so that no charring of the tips of the bristles takes place while the bristles are being molded.

Having thus described our invention, we claim:

1. An apparatus for molding bristled products from plastic material, said molding apparatus comprising a plurality of elongated pins each being polygonal in cross section over at least part of the length thereof, means retaining said elongated pins at one end thereof so that said pins project therefrom in a generally rectangular group and in generally parallel abutting relation with each other but loosely assembled at the cantilevered free ends thereof, means for urging said free ends of said pins into abutment, means defining a backing cavity communicating with the free ends of said pins, the side surfaces at and adjacent the free ends of at least some of said pins being configured and arranged with each other to co-operably define bristle-forming cavities therebetween, said bristle defining cavities communicating with said backing cavity and extending longitudinally from said free end faces along part of the length of said pins to receive plastic material injected into said cavities in the molding of bristled products and means for injecting plastic material into said backing cavity for flow into said bristle-defining cavities.

2. The mold assembly of claim 1 in which said means for urging said free ends of said pins into abutment comprises a plurality of cam means for applying force to said pins in at least two directions normal to each other.

3. The mold assembly of claim 2 in which each said cam means comprises a pair of plates, one of said plates contacting said group of elongated pins along one surface thereof and having another surface at an angle to said one surface, and the other of said plates having a surface complementary to said another surface and slidably contacting the same for urging said one plate against said group of elongated pins.

4. The mold assembly of claim 3 in which four of said cam means are provided to apply force to four sides of said group of elongated pins.

5. The mold assembly of claim 1 in which said means retaining said elongated pins in a group comprises plate means having a plurality of apertures through the same, said elongated pins having portions respectively extending through said apertures and anchored to said plate means on opposite sides thereof.

6. The mold assembly of claim 5 in which said side surfaces of said elongated pins are round and each group of four adjoining pins define a bristle-forming cavity centrally thereof.

7. The mold assembly of claim 5 in which said side surfaces of said elongated pins are flat, and in which each of said flat surfaces has at least one groove therein defining with a surface of an adjoining pin a bristle-forming cavity.

8. The mold assembly of claim 5 in which said side surfaces of said elongated pins are flat, but the corners of said pins between said flat surfaces are rounded so that each group of four adjoining pins defines a bristle-forming cavity centrally thereof.

9. The mold assembly of claim 5 in which said side surfaces of said elongated pins are flat and form an octagon so that each group of four adjoining pins defines a bristle-forming cavity centrally thereof.

10. The mold assembly of claim 5 in which said side surfaces of said elongated pins are flat and each said side surface has a groove therein, said grooves being at an angle relative to the longitudinal direction of said pins in order to define a bristle having a single base portion with two finger portions diverging from said base portion.

11. In an apparatus for molding bristled products from plastic material, a plurality of elongated pins each having a polygonal shape in cross-section, means retaining said elongated pins in a group in parallel abutting relation with each other, the end faces of said pins being coplanar with each other, said pins having co-operable surfaces adjacent said end surfaces and defining therebetween bristle-forming cavities extending longitudinally of said pins and opening onto said end faces, a backing cavity communicating with the end faces of said pins, and means for injecting plastic material into said backing cavity for flow into said bristle-forming cavities.

References Cited

UNITED STATES PATENTS

| | | |
|---|---|---|
| 881,912 | 3/1908 | Emrick. |
| 2,355,744 | 8/1944 | Myers. |
| 2,592,296 | 4/1952 | Kutik. |
| 3,004,291 | 10/1961 | Schod. |
| 3,125,776 | 3/1964 | Lilley. |
| 3,173,177 | 3/1965 | Rybka. |
| 3,277,535 | 10/1966 | Rupert. |
| 3,312,583 | 4/1967 | Rochlis. |
| 3,357,058 | 12/1967 | Kutik. |

FOREIGN PATENTS

| | | |
|---|---|---|
| 241,683 | 11/1962 | Australia. |
| 59,707 | 2/1954 | France. |
| | | (First addition) |
| 868,957 | 5/1961 | Great Britain. |
| 918,041 | 2/1963 | Great Britain. |

J. HOWARD FLINT, Jr., Primary Examiner

U.S. Cl. X.R.

15—187; 18—44; 249—141, 162, 163, 167; 264—243